(12) United States Patent
Cheng et al.

(10) Patent No.: US 11,252,634 B2
(45) Date of Patent: Feb. 15, 2022

(54) TECHNIQUES FOR PROVIDING AND/OR APPLYING QUALITY OF SERVICE IN WIRELESS COMMUNICATIONS

(71) Applicant: QUALCOMM Incorporated, San Diego, CA (US)

(72) Inventors: Hong Cheng, Bridgewater, NJ (US); Michaela Vanderveen, Tracy, CA (US); Sudhir Kumar Baghel, Hillsborough, NJ (US); Kapil Gulati, Hillsborough, NJ (US); Zhibin Wu, Los Altos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/849,668

(22) Filed: Apr. 15, 2020

(65) Prior Publication Data

US 2020/0245219 A1    Jul. 30, 2020

Related U.S. Application Data

(62) Division of application No. 16/248,491, filed on Jan. 15, 2019, now Pat. No. 11,082,908.

(60) Provisional application No. 62/619,546, filed on Jan. 19, 2018.

(51) Int. Cl.
| | |
|---|---|
| *H04L 12/851* | (2013.01) |
| *H04W 28/24* | (2009.01) |
| *H04W 28/02* | (2009.01) |
| *H04L 29/06* | (2006.01) |
| *H04W 40/12* | (2009.01) |

(Continued)

(52) U.S. Cl.
CPC ............ *H04W 40/12* (2013.01); *H04L 47/24* (2013.01); *H04W 28/0268* (2013.01); *H04W 28/24* (2013.01); *H04L 69/22* (2013.01); *H04W 28/18* (2013.01); *H04W 88/06* (2013.01)

(58) Field of Classification Search
CPC ..... H04W 40/12; H04W 28/18; H04W 28/24; H04W 88/06; H04L 47/24
USPC ......................................................... 370/328
See application file for complete search history.

(56) References Cited

U.S. PATENT DOCUMENTS

| | | |
|---|---|---|
| 2011/0310851 A1 | 12/2011 | Klingenbrunn et al. |
| 2016/0277274 A1 | 9/2016 | Burman et al. |
| 2016/0338102 A1* | 11/2016 | Nuggehalli ........... H04W 48/16 |

(Continued)

FOREIGN PATENT DOCUMENTS

WO    2005117362 A1    12/2005

OTHER PUBLICATIONS

International Search Report and Written Opinion—PCT/US2019/013824—ISA/EPO—May 28, 2019.

(Continued)

*Primary Examiner* — Angel T Brockman
(74) *Attorney, Agent, or Firm* — Arent Fox LLP

(57) ABSTRACT

Aspects of the present disclosure describe indicating per-packet quality of service (QoS). A first packet can be obtained, by a wireless communications device, from an application generated for a radio access technology (RAT), where the first packet includes a QoS value associated with the RAT. A reflective indicator can be set in a header of the first packet to indicate a configuration, including a QoS (Continued)

value, to be used by a receiving device in transmitting a second packet. The first packet can be transmitted to the receiving device.

30 Claims, 10 Drawing Sheets

(51) Int. Cl.
*H04W 28/18* (2009.01)
*H04W 88/06* (2009.01)

(56) References Cited

U.S. PATENT DOCUMENTS

| | | |
|---|---|---|
| 2019/0037430 A1 | 1/2019 | Lee et al. |
| 2019/0045421 A1 | 2/2019 | Shah et al. |
| 2019/0053010 A1 | 2/2019 | Edge et al. |
| 2019/0124015 A1 | 4/2019 | Loehr et al. |
| 2019/0230572 A1 | 7/2019 | Cheng et al. |

OTHER PUBLICATIONS

Partial International Search Report issued in PCT/US2019/013824, dated Apr. 4, 2019 (13 pages).

\* cited by examiner

US 11,252,634 B2

TECHNIQUES FOR PROVIDING AND/OR APPLYING QUALITY OF SERVICE IN WIRELESS COMMUNICATIONS

CLAIM OF PRIORITY UNDER 35 U.S.C. § 119

The present application for patent is a divisional application of application Ser. No. 16/248,491, entitled "TECHNIQUES FOR PROVIDING AND/OR APPLYING QUALITY OF SERVICE IN WIRELESS COMMUNICATIONS" filed Jan. 15, 2019, which claims priority to Provisional Application No. 62/619,546, entitled "TECHNIQUES FOR PROVIDING AND/OR APPLYING QUALITY OF SERVICE IN WIRELESS COMMUNICATIONS" filed Jan. 19, 2018, which are assigned to the assignee hereof and hereby expressly incorporated by reference herein for all purposes.

BACKGROUND

Aspects of the present disclosure relate generally to wireless communication systems, and more particularly, to quality of service (QoS) in wireless communications.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in 5G communications technology and beyond may be desired.

In some configurations, 5G NR technologies can provide support for communications device-to-device (D2D) communications, such as vehicle-to-vehicle (V2V) communications, vehicle-to-pedestrian (V2P) communications, vehicle-to-infrastructure (V2I) communications, etc., which can be collectively referred to as vehicle-to-everything (V2X) communications. Current mechanisms for providing QoS in V2X (e.g., as defined for long term evolution (LTE)), however, may not be sufficient for 5G NR due to increased requirements for reliability, error rate, delay, etc. in 5G NR.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for indicating per-packet quality of service (QoS) in communications by a vehicle-to-everything (V2X) device is provided. The method includes obtaining a packet from an application generated for a first radio access technology (RAT), where the packet includes a first QoS value associated with the first RAT, determining to transmit the packet using a second RAT, mapping, based on determining to transmit the packet using the second RAT, the first QoS value to a second QoS value associated with the second RAT, indicating the second QoS value in the packet, and transmitting, using the second RAT, the packet with the second QoS value to one or more devices.

In another example, a method for indicating per-packet QoS in communications transmitted by a V2X device is provided. The method includes obtaining a first packet from an application generated for a RAT, where the packet includes a QoS value associated with the RAT, setting a reflective indicator in a header of the first packet to indicate a configuration, including a QoS value, to be used by the receiving device in transmitting a second packet, and transmitting the first packet to the receiving device.

In another example, a method for determining per-packet QoS in communications received by a wireless communications device is provided. The method includes receiving, by the wireless communications device and from a transmitting device, a first packet generated for a RAT, where the first packet includes a QoS value associated with the RAT, detecting a reflective indicator in a header of the first packet to indicate a configuration, including a QoS value, to be used in transmitting a second packet, and transmitting, by the wireless communications device and based on detecting the reflective indicator and according to the QoS value, the second packet to the transmitting device.

In another example, an apparatus for communicating in wireless communications is provided. The apparatus includes a transceiver for communicating one or more wireless signals via at least a transmitter and one or more antennas, a memory configured to store instructions, and one or more processors communicatively coupled with the transceiver and the memory. The one or more processors are configured to obtain a packet from an application generated for a RAT, where the packet includes a first QoS value associated with the first RAT and where the packet is intended for one or more other devices, determine to transmit the packet to the one or more other devices using a second RAT, map, based on determining to transmit the packet using the second RAT, the first QoS value to a second QoS value associated with the second RAT, indicate the second QoS value in the packet, and transmit, using the second RAT, the packet with the second QoS value to the one or more other devices.

In another example, an apparatus for communicating in wireless communications, is provided. The apparatus includes a transceiver for communicating one or more wireless signals via at least a transmitter and one or more antennas, a memory configured to store instructions, and one or more processors communicatively coupled with the transceiver and the memory. The one or more processors are configured to obtain a first packet from an application generated for a RAT, where the first packet includes a QoS value associated with the RAT, set a reflective indicator in a header of the first packet to indicate a configuration, including a QoS value, to be used by a receiving device in transmitting a second packet, and transmit the first packet to the receiving device In a further aspect, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
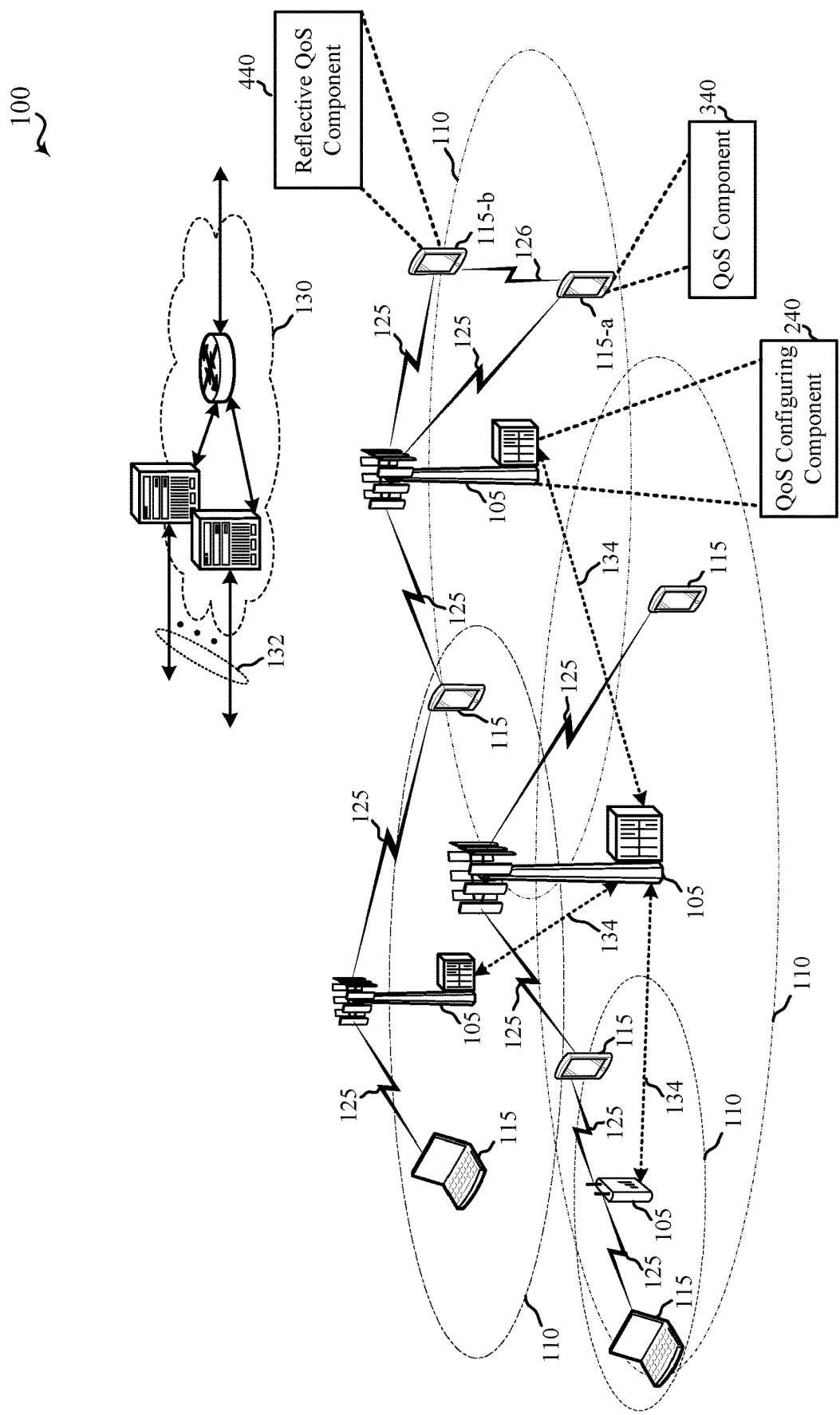
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to adapting quality-of-service (QoS) in device-to-device (D2D) communications of one wireless communication technology to fulfill specifications or requirements in another wireless communication technology. For example, D2D communications in a legacy wireless communication technology, such as third generation partnership project (3GPP) long term evolution (LTE) can be adapted to fulfill specifications or requirements in a low latency wireless communication technologies, such as fifth generation (5G) new radio (NR) technologies, which may include enhanced mobile broadband, ultra-reliable-low latency communications (URLLC), etc. Certain types of D2D communications may include vehicle-to-vehicle (V2V) communications, vehicle-to-pedestrian (V2P) communications, vehicle-to-infrastructure (V2I) communications, etc., which can be collectively referred to as vehicle-to-everything (V2X) communications. In LTE, QoS defined for V2X is based on D2D pro se per packet priority (PPPP), e.g., as defined in 3GPP technical specification (TS) 23.303. In D2D PPPP, per packet priority is indicated by the application layer and has 8 possible values, which may be insufficient to effectively indicate QoS for NR technologies such to achieve reliability/error rate, delay, or similar metrics in the NR technologies.

Accordingly, for example, QoS for V2X can be extended in NR technologies to support additional QoS values per packet. In one example, a device broadcasting over multiple carriers (e.g., to support NR and legacy technologies, such as LTE) can broadcast a given packet over the multiple carriers by mapping, e.g., at a non-access stratum (NAS) layer, a QoS value defined by an application for one technology (e.g., NR or LTE) to another technology (e.g., LTE or NR) for transmission over the multiple carriers. This can ensure backward compatibility for devices receiving the QoS values.

For unicast and/or multicast communications where a virtual link can exist between devices, different QoS can apply for different links between the devices and/or other devices. In addition, devices may have different capabilities, which can result in the different QoSs to be applied. Accordingly, for example, a reflective QoS mechanism can be adopted where a transmitting device can instruct a receiving device for applying certain QoS on outgoing traffic. Thus, the transmitting device can indicate, to the receiving device, whether to derive and/or apply a reflective configuration for QoS, meaning that the receiving device should utilize the QoS used by the transmitting device, for sending response traffic back to the transmitting device.

The described features will be presented in more detail below with reference to FIGS. 1-10.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 illustrates an example of a wireless communication system 100 in accordance with various aspects of the present disclosure. The wireless communication system 100 may include one or more base stations 105, one or more UEs 115, and a core network 130. The core network 130 may provide user authentication, access authorization, tracking, internet protocol (IP) connectivity, and other access, routing, or mobility functions. The base stations 105 may interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g., X2, etc.), which may be wired or wireless communication links.

The base stations 105 may wirelessly communicate with the UEs 115 via one or more base station antennas. Each of the base stations 105 may provide communication coverage for a respective geographic coverage area 110. In some examples, base stations 105 may be referred to as a network entity, a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may be or include a Long Term Evolution (LTE) or LTE-Advanced (LTE-A) network. The wireless communication system 100 may also be a next generation network, such as a 5G wireless communication network. In LTE/LTE-A networks, the term evolved node B (eNB), gNB, etc. may be generally used to describe the base stations 105, while the term UE may be generally used to describe the UEs 115. The wireless communication system 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs 115 with service subscriptions with the network provider.

A small cell may include a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB, gNB, etc. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A packet data convergence protocol (PDCP) layer can provide header compression, ciphering, integrity protection, etc. of IP packets. A radio link control (RLC) layer may perform packet segmentation and reassembly to communicate over logical channels. A media access control (MAC) layer may perform priority handling and multiplexing of logical channels into transport channels. The MAC layer may also use HARQ to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, an entertainment device, a vehicular component, or the like. A UE may be able to communicate with various types of base stations and network equipment including macro eNBs, small cell eNBs, relay base stations, and the like.

The communication links 125 shown in wireless communication system 100 may carry UL transmissions from a UE 115 to a base station 105, or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

In aspects of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple input multiple output (MIMO) techniques that may take advantage of multi-path environments to transmit multiple spatial layers carrying the same or different coded data.

Wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In aspects of the wireless communication system 100, UEs 115 may be capable of D2D communications, such as V2V, V2P, V2I, or collectively V2X. Thus, for example, UEs 115 may be devices integrated in and/or capable of communicating from a vehicle to/with another device in a vehicle, on a pedestrian, etc. In a specific example, a UE 115-a can communicate with another UE 115-b over a D2D communication link 126, also referred to as a sidelink. In one example, at least one of the UEs 115-a, 115-b can be a V2X device that can communicate over the D2D communication link 126 using a D2D or V2X technology. UEs 115-a and/or 115-b can communicate over the D2D communication link 126 based on a first RAT, such as 5G NR, and/or a second RAT, such as LTE. In one example, UE 115-a can broadcast communications over the D2D communication link 126 for receiving by one or more UEs 115-b. In any case, UE 115-a can include a QoS component 340 for providing QoS for traffic transmitted in broadcast, or in unicast or multicast at least to UE 115-b. UE 115-b may optionally include a reflective QoS component 440 for adapting a reflective QoS mechanism for providing QoS for response traffic to the UE 115-a. In yet another example, UE 115-a can also communicate with a base station 105, where the base station 105 may include a QoS configuring component 240 for configuring one or more QoS parameters for the UE 115-a for providing the QoS and/or reflective QoS configuration in communicating with the UE 115-b.

Figure 3:
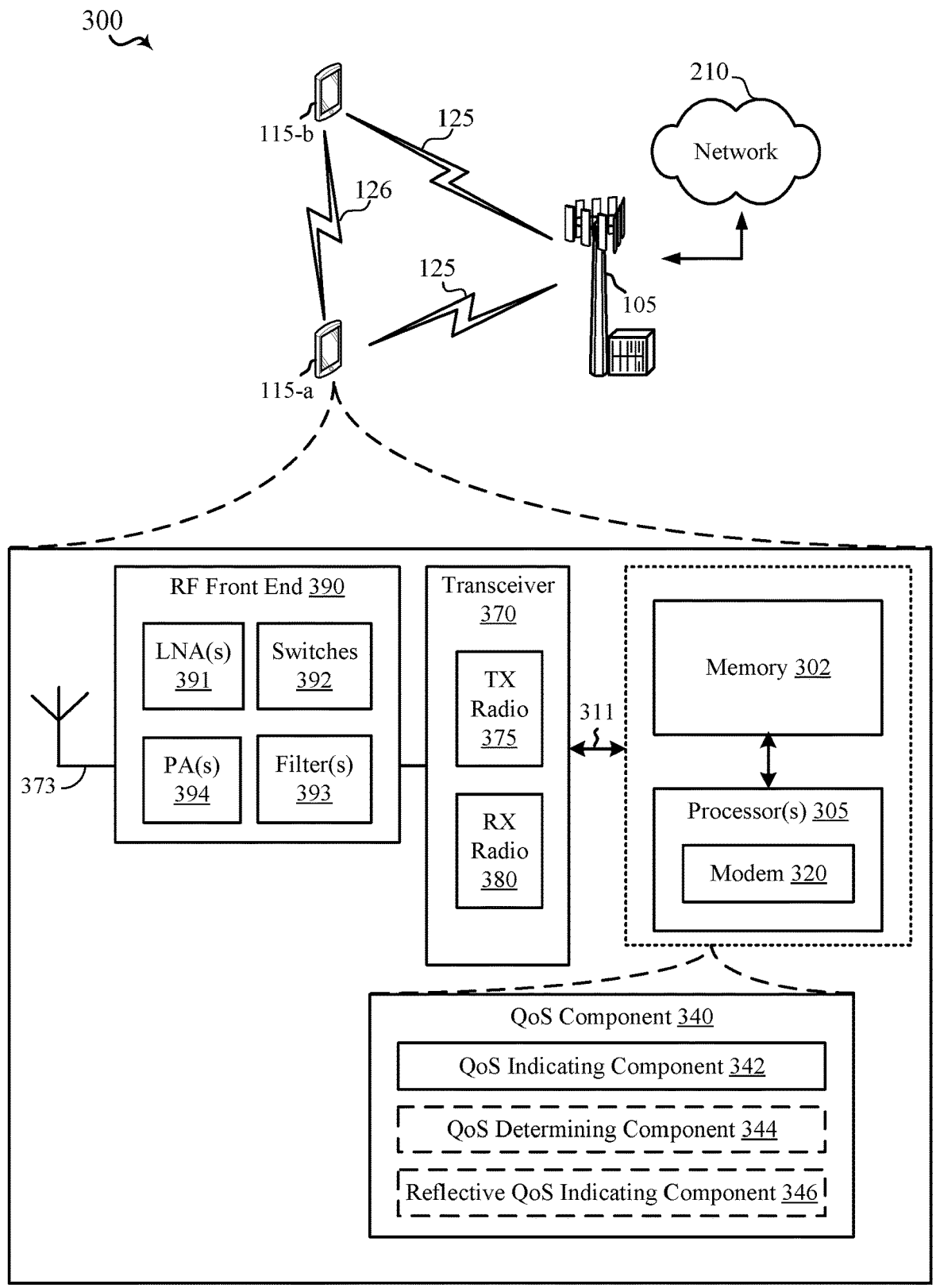
FIG. 3 is a block diagram illustrating an example of a transmitting UE, in accordance with various aspects of the present disclosure.
Figure 4:
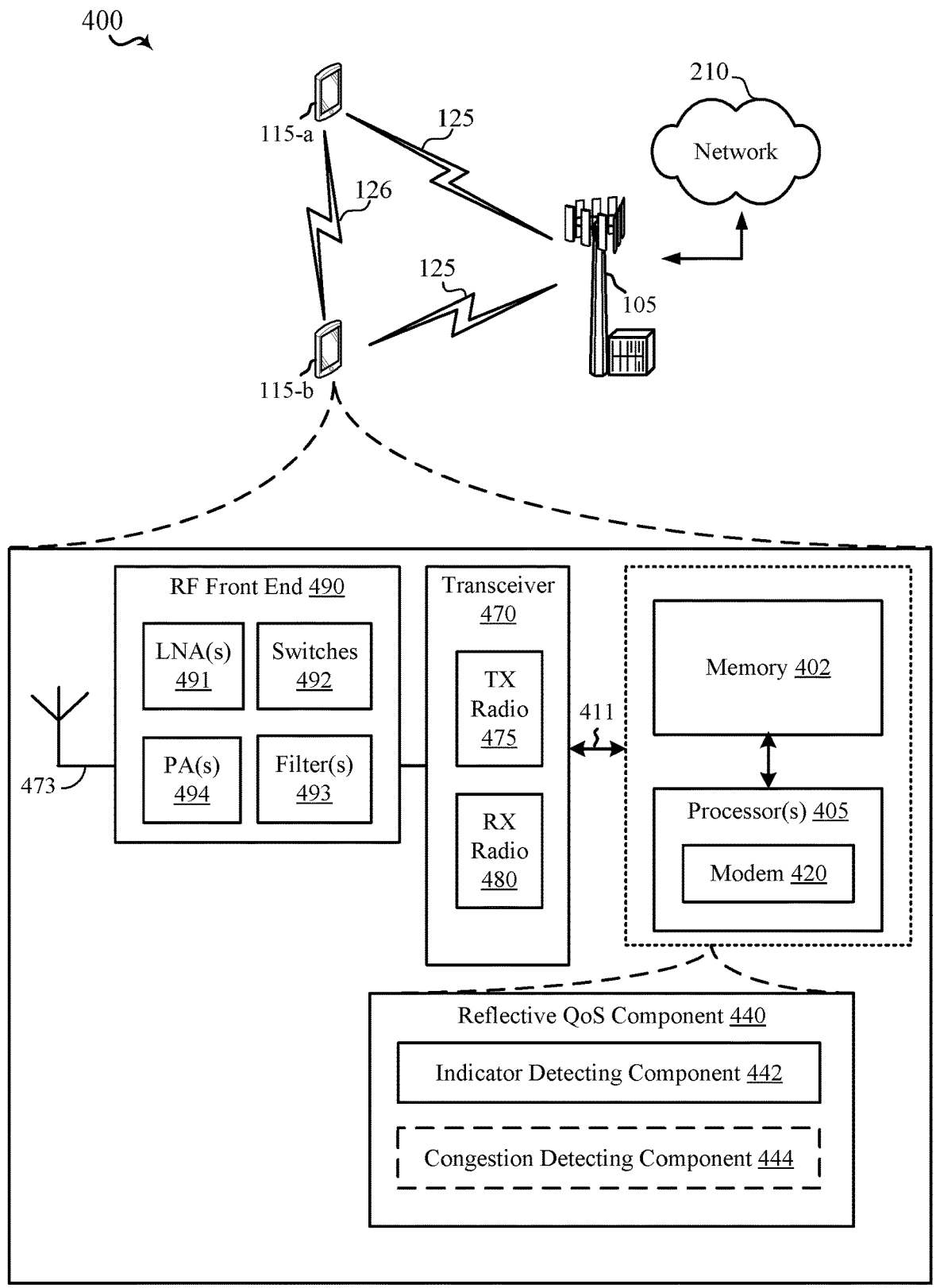
FIG. 4 is a block diagram illustrating an example of a receiving UE, in accordance with various aspects of the present disclosure.
Figure 5:
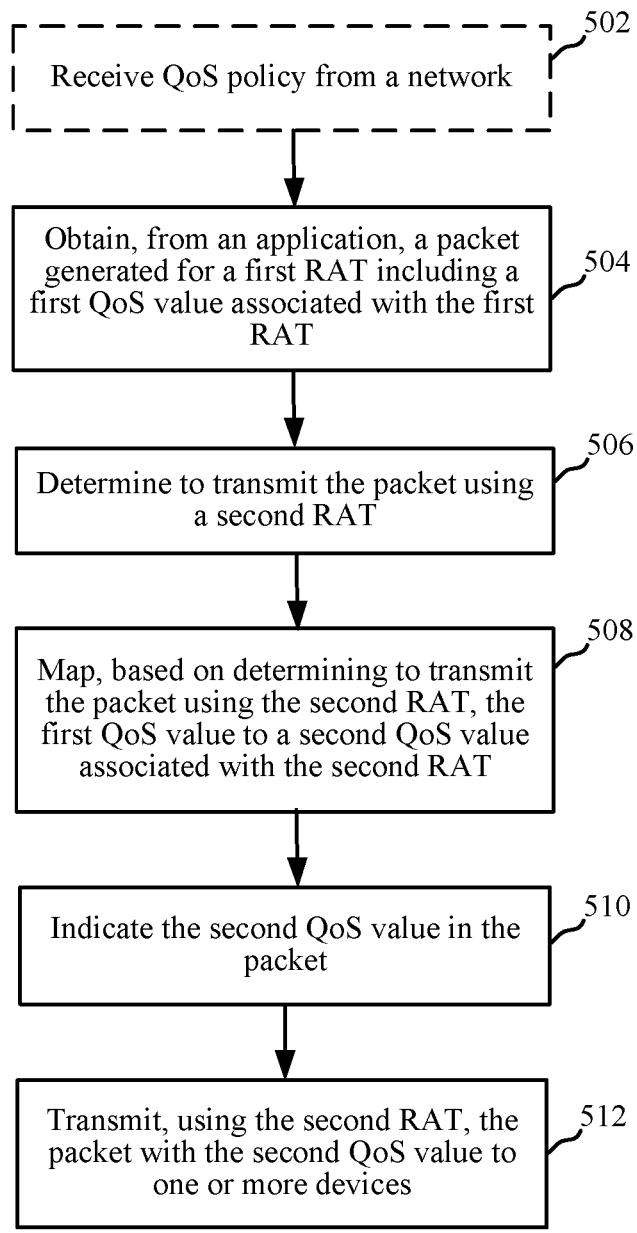
FIG. 5 is a flow chart illustrating an example of a method for transmitting broadcast communications with quality-of-service (QoS), in accordance with various aspects of the present disclosure.
Figure 6:
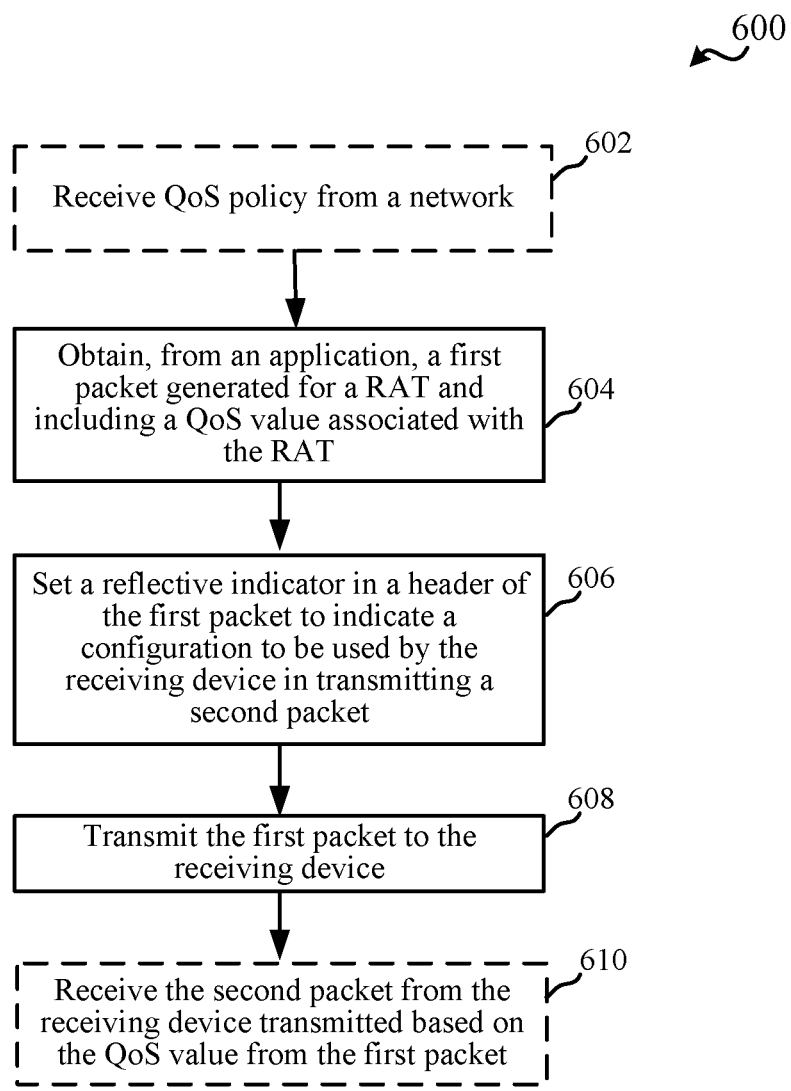
FIG. 6 is a flow chart illustrating an example of a method for transmitting unicast or multicast communications with QoS, in accordance with various aspects of the present disclosure.
Figure 7:
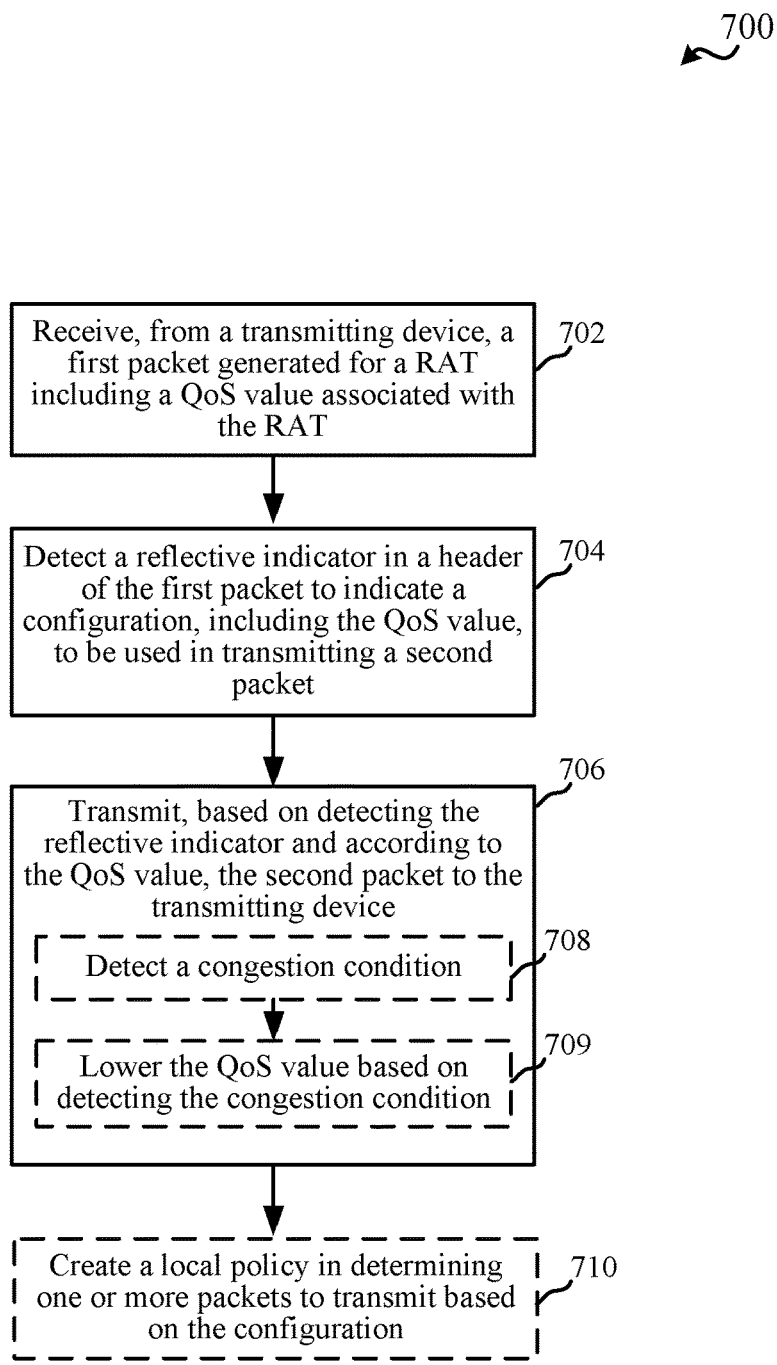
FIG. 7 is a flow chart illustrating an example of a method for receiving unicast or multicast communications with QoS, in accordance with various aspects of the present disclosure.

Turning now to FIGS. 2-10, aspects are depicted with reference to one or more components and one or more methods that may perform the actions or operations described herein, where aspects in dashed line may be optional. Although the operations described below in FIGS. 5-7 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Figure 2:
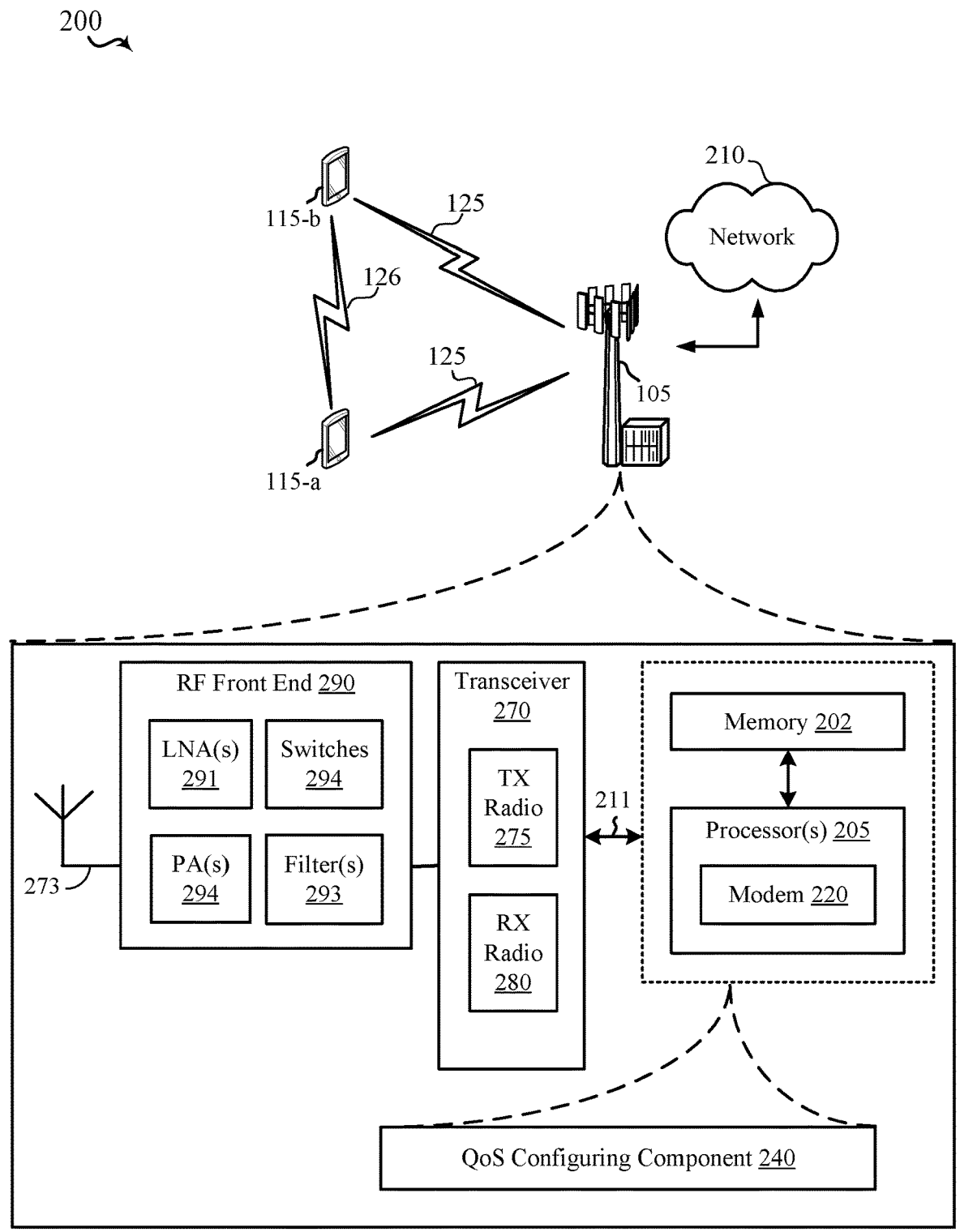
FIG. 2 is a block diagram illustrating an example of a base station, in accordance with various aspects of the present disclosure.

Referring to FIG. 2, a block diagram 200 is shown that includes a portion of a wireless communications system having multiple UEs 115-a, 115-b, one or more of which can be in communication with a base station 105 via communication links 125, where the base station 105 is also connected to a network 210. The UEs 115 may be examples of the UEs described in the present disclosure that are configured to communicate with one another over a D2D communication link 126, which can be a direct link that may not include base station 105, and/or provide QoS for communications over the communication link 126. Moreover the base station 105 may be an example of the base stations described in the present disclosure (e.g., eNB, gNB, other types of access points, etc. providing one or more macrocells, small cells, etc.) that may be configured to configure the one or more UEs 115-a, 115-b with QoS parameters for communicating with one another and/or for otherwise accessing network 210.

In an aspect, the base station in FIG. 2 may include one or more processors 205 and/or memory 202 that may operate in combination with a QoS configuring component 240 to perform the functions, methods, etc. presented in the present disclosure. In accordance with the present disclosure, the QoS configuring component 240 may configure one or more UEs, such as UE 115-a, with parameters for applying a QoS to communications with another UE, such as UE 115-b, over a D2D communication link 126.

The one or more processors 205 may include a modem 220 that uses one or more modem processors. The various functions related to the QoS configuring component 240, and/or its sub-components, may be included in modem 220 and/or processor 205 and, in an aspect, can be executed by a single processor, while in other aspects, different ones of the functions may be executed by a combination of two or more different processors. For example, in an aspect, the one or more processors 205 may include any one or any combination of a modem processor, or a baseband processor, or a digital signal processor, or a transmit processor, or a transceiver processor associated with transceiver 270, or a system-on-chip (SoC). In particular, the one or more processors 205 may execute functions and components included in the QoS configuring component 240. In another example, QoS configuring component 240 may operate at one or more communication layers, such as a physical layer (e.g., layer 1 (L1)), media access control (MAC) layer (e.g., layer 2 (L2)), PDCP layer or RLC layer (e.g., layer 3 (L3)), etc., to provide configuration information to the one or more UEs, etc.

In some examples, the QoS configuring component 240 and each of the sub-components may comprise hardware, firmware, and/or software and may be configured to execute code or perform instructions stored in a memory (e.g., a computer-readable storage medium, such as memory 202 discussed below). Moreover, in an aspect, the base station 105 in FIG. 2 may include a radio frequency (RF) front end 290 and transceiver 270 for receiving and transmitting radio transmissions to, for example, UEs 115. The transceiver 270 may coordinate with the modem 220 to receive signals for, or transmit signals generated by, the QoS configuring component 240 to the UEs. RF front end 290 may be connected to one or more antennas 273 and can include one or more switches 292, one or more amplifiers (e.g., power amplifiers (PAs) 294 and/or low-noise amplifiers 291), and one or more filters 293 for transmitting and receiving RF signals on uplink channels and downlink channels, transmitting and receiving signals, etc. In an aspect, the components of the RF front end 290 can connect with transceiver 270. The transceiver 270 may connect to one or more of modem 220 and processors 205.

The transceiver 270 may be configured to transmit (e.g., via transmitter (TX) radio 275) and receive (e.g., via receiver (RX) radio 280) wireless signals through antennas 273 via the RF front end 290. In an aspect, the transceiver 270 may be tuned to operate at specified frequencies such that the base station 105 can communicate with, for example, UEs 115. In an aspect, for example, the modem 220 can configure the transceiver 270 to operate at a specified frequency and power level based on the configuration of the base station 105 and communication protocol used by the modem 220.

The base station 105 in FIG. 2 may further include a memory 202, such as for storing data used herein and/or local versions of applications or QoS configuring component 240 and/or one or more of its sub-components being executed by processor 205. Memory 202 can include any type of computer-readable medium usable by a computer or processor 205, such as random access memory (RAM), read only memory (ROM), tapes, magnetic discs, optical discs, volatile memory, non-volatile memory, and any combination thereof. In an aspect, for example, memory 202 may be a computer-readable storage medium that stores one or more computer-executable codes defining QoS configuring component 240 and/or one or more of its sub-components. Additionally or alternatively, the base station 105 may include a bus 211 for coupling one or more of the RF front end 290, the transceiver 274, the memory 202, or the processor 205, and to exchange signaling information between each of the components and/or sub-components of the base station 105.

In an aspect, the processor(s) 205 may correspond to one or more of the processors described in connection with the base station in FIG. 10. Similarly, the memory 202 may correspond to the memory described in connection with the base station in FIG. 10.

Referring to FIG. 3, a block diagram 300 is shown that includes a portion of a wireless communications system having multiple UEs 115-a, 115-b, one or more of which can be in communication with a base station 105 via communication links 125, where the base station 105 is also connected to a network 210. The UEs 115 may be examples of the UEs described in the present disclosure that are configured to communicate with one another over a D2D communication link 126, which can be a direct link that may not include base station 105, and/or provide QoS for communications over the communication link 126. Moreover the base station 105 may be an example of the base stations described in the present disclosure (e.g., eNB, gNB, other types of access points, etc. providing one or more macrocells, small cells, etc.) that may be configured to configure the one or more UEs 115-a, 115-b with QoS parameters for communicating with one another and/or for otherwise accessing network 210.

In an aspect, the UE 115-a in FIG. 3 may include one or more processors 305 and/or memory 302 that may operate in combination with a QoS component 340 to perform the functions, methods (e.g., method 500, 600 of FIGS. 5, 6), etc., presented in the present disclosure. In accordance with the present disclosure, the QoS component 340 may include one or more components for providing a QoS to communications between the UE 115-a and another UE (e.g., UE 115-b), such as a QoS indicating component 342 for determining and/or indicating a QoS to be associated with communications (e.g., broadcast, unicast, or multicast communications), an optional QoS determining component 344 for determining a RAT for which the QoS is to be provided, and/or an optional reflective QoS indicating component 346 for indicating whether the UE 115-b is to use the same QoS configuration in communicating with the UE 115-a.

The one or more processors 305 may include a modem 320 that uses one or more modem processors. The various functions related to the QoS component 340, and/or its sub-components, may be included in modem 320 and/or processor 305 and, in an aspect, can be executed by a single processor, while in other aspects, different ones of the functions may be executed by a combination of two or more different processors. For example, in an aspect, the one or more processors 305 may include any one or any combination of a modem processor, or a baseband processor, or a digital signal processor, or a transmit processor, or a transceiver processor associated with transceiver 370, or a system-on-chip (SoC). In particular, the one or more processors 305 may execute functions and components included in the QoS component 340. In another example, QoS component 340 may operate at one or more communication layers, such as physical layer or L1, MAC layer or L2, a PDCP/RLC layer or L3, etc., to determine and/or apply a QoS configuration to communications, indicate a QoS level and/or a reflective indicator, etc.

In some examples, the QoS component 340 and each of the sub-components may comprise hardware, firmware, and/or software and may be configured to execute code or perform instructions stored in a memory (e.g., a computer-readable storage medium, such as memory 302 discussed below). Moreover, in an aspect, the UE 115-a in FIG. 3 may include an RF front end 390 and transceiver 370 for receiving and transmitting radio transmissions to, for example, UE 115-b and/or base stations 105. The transceiver 370 may coordinate with the modem 320 to receive signals that include packets (e.g., and/or one or more related PDUs). RF front end 390 may be connected to one or more antennas 373 and can include one or more switches 392, one or more amplifiers (e.g., PAs 394 and/or LNAs 391), and one or more filters 393 for transmitting and receiving RF signals on uplink channels and downlink channels. In an aspect, the components of the RF front end 390 can connect with transceiver 370. The transceiver 370 may connect to one or more of modem 320 and processors 305.

The transceiver 370 may be configured to transmit (e.g., via transmitter (TX) radio 375) and receive (e.g., via receiver (RX) radio 380) wireless signals through antennas 373 via the RF front end 390. In an aspect, the transceiver 370 may be tuned to operate at specified frequencies such that the UE 115-a can communicate with, for example, another UE 115-b and/or base stations 105. In an aspect, for example, the modem 320 can configure the transceiver 370 to operate at a specified frequency and power level based on the configuration of the UE 115-a and communication protocol used by the modem 320.

The UE 115-a in FIG. 3 may further include a memory 302, such as for storing data used herein and/or local versions of applications or QoS component 340 and/or one or more of its sub-components being executed by processor 305. Memory 302 can include any type of computer-readable medium usable by a computer or processor 305, such as RAM, ROM, tapes, magnetic discs, optical discs, volatile memory, non-volatile memory, and any combination thereof. In an aspect, for example, memory 302 may be a computer-readable storage medium that stores one or more computer-executable codes defining QoS component 340 and/or one or more of its sub-components. Additionally or alternatively, the UE 115-a may include a bus 311 for coupling one or more of the RF front end 390, the transceiver 374, the memory 302, or the processor 305, and to exchange signaling information between each of the components and/or sub-components of the UE 115-a.

In an aspect, the processor(s) 305 may correspond to one or more of the processors described in connection with the UE in FIG. 10. Similarly, the memory 302 may correspond to the memory described in connection with the UE in FIG. 10.

Referring to FIG. 4, a block diagram 400 is shown that includes a portion of a wireless communications system having multiple UEs 115-a, 115-b, one or more of which can be in communication with a base station 105 via communication links 125, where the base station 105 is also connected to a network 210. The UEs 115 may be examples of the UEs described in the present disclosure that are configured to communicate with one another over a D2D communication link 126, which can be a direct link that may not include base station 105, and/or provide QoS for communications over the communication link 126. Moreover the base station 105 may be an example of the base stations described in the present disclosure (e.g., eNB, gNB, other types of access points, etc. providing one or more macro-cells, small cells, etc.) that may be configured to configure the one or more UEs 115-a, 115-b with QoS parameters for communicating with one another and/or for otherwise accessing network 210.

In an aspect, the UE 115-b in FIG. 4 may include one or more processors 405 and/or memory 402 that may operate in combination with a reflective QoS component 440 to perform the functions, methods (e.g., method 700 of FIG. 7), etc., presented in the present disclosure. In one example, a given UE can include components of UE 115-a shown and described with respect to FIGS. 3 and 4. In accordance with the present disclosure, the reflective QoS component 440 may include one or more components for providing a QoS to communications between the UE 115-b and another UE (e.g., UE 115-a), such as an indicator detecting component 442 for detecting a reflective QoS indicator received from the other UE 115-a for determining QoS parameters to apply in communicating with the UE 115-a, and/or an optional congestion detecting component 444 for detecting one or more parameters related to a congestion condition at the UE 115-b, which may result in lowering a QoS.

The one or more processors 405 may include a modem 420 that uses one or more modem processors. The various functions related to the reflective QoS component 440, and/or its sub-components, may be included in modem 420 and/or processor 405 and, in an aspect, can be executed by a single processor, while in other aspects, different ones of the functions may be executed by a combination of two or more different processors. For example, in an aspect, the one or more processors 405 may include any one or any combination of a modem processor, or a baseband processor, or a digital signal processor, or a transmit processor, or a transceiver processor associated with transceiver 470, or a system-on-chip (SoC). In particular, the one or more processors 405 may execute functions and components included in the reflective QoS component 440. In another example, reflective QoS component 440 may operate at one or more communication layers, such as physical layer or L1, MAC layer or L2, a PDCP/RLC layer or L3, etc., to receive and/or apply a QoS configuration to communications, detect a QoS level and/or a reflective indicator, etc.

In some examples, the reflective QoS component 440 and each of the sub-components may comprise hardware, firmware, and/or software and may be configured to execute code or perform instructions stored in a memory (e.g., a computer-readable storage medium, such as memory 402 discussed below). Moreover, in an aspect, the UE 115-b in FIG. 4 may include an RF front end 490 and transceiver 470 for receiving and transmitting radio transmissions to, for example, UE 115-a and/or base stations 105. The transceiver 470 may coordinate with the modem 420 to receive signals that include packets (e.g., and/or one or more related PDUs). RF front end 490 may be connected to one or more antennas 473 and can include one or more switches 492, one or more amplifiers (e.g., PAs 494 and/or LNAs 491), and one or more filters 493 for transmitting and receiving RF signals on uplink channels and downlink channels. In an aspect, the components of the RF front end 490 can connect with transceiver 470. The transceiver 470 may connect to one or more of modem 420 and processors 405.

The transceiver 470 may be configured to transmit (e.g., via transmitter (TX) radio 475) and receive (e.g., via receiver (RX) radio 480) wireless signals through antennas 473 via the RF front end 490. In an aspect, the transceiver 470 may be tuned to operate at specified frequencies such that the UE 115-b can communicate with, for example, UE 115-a and/or base stations 105. In an aspect, for example, the modem 420 can configure the transceiver 470 to operate at a specified frequency and power level based on the configuration of the UE 115-b and communication protocol used by the modem 420.

The UE 115-b in FIG. 4 may further include a memory 402, such as for storing data used herein and/or local versions of applications or reflective QoS component 440 and/or one or more of its sub-components being executed by processor 405. Memory 402 can include any type of computer-readable medium usable by a computer or processor 405, such as RAM, ROM, tapes, magnetic discs, optical discs, volatile memory, non-volatile memory, and any combination thereof. In an aspect, for example, memory 402 may be a computer-readable storage medium that stores one or more computer-executable codes defining reflective QoS component 440 and/or one or more of its sub-components. Additionally or alternatively, the UE 115-b may include a bus 411 for coupling one or more of the RF front end 490, the transceiver 474, the memory 402, or the processor 405, and to exchange signaling information between each of the components and/or sub-components of the UE 115-b.

In an aspect, the processor(s) 405 may correspond to one or more of the processors described in connection with the UE in FIG. 10. Similarly, the memory 402 may correspond to the memory described in connection with the UE in FIG. 10.

FIG. 5 illustrates a flow chart of an example of a method 500 for applying (e.g., by a UE 115-a) QoS for transmitting communications to one or more other UEs.

In method 500, optionally at Block 502, a QoS policy can be received from a network. In an aspect, QoS component 340, e.g., in conjunction with processor(s) 305, memory 302, transceiver 370, etc., can receive the QoS policy from the network. For example, QoS component 340 can receive the QoS policy from the network via base station 105 (e.g., which can configure the QoS policy via QoS configuring component 240), from one or more other UEs (e.g., in D2D or V2X communications), from a V2X Application Server via any available connection, and/or the like. For example, the QoS policy may indicate one or more parameters for determining whether to use a first or second RAT (e.g., and/or associated QoS values) in transmitting one or more packets from one or more applications, as described further below. For example, the QoS policy may indicate parameters related to determining whether to use a first or second RAT, such as whether to use the first or second RAT based on a provider service identifier (PSID) of the application that generated the packet, based on one or more parameters related to a load at the UE 115-a (e.g., related to the first or second RAT), based on one or more ranging or power parameters (e.g., Tx power level requirements, or distance requirements) at the UE 115-a, etc.

For example, the QoS policy may be configured by the base station 105 based on one or more parameters regarding the subscription of the UE 115-a (e.g., a service level of the subscription), a location of the UE 115-a, etc. In this regard, for example, the base station 105 (e.g., via QoS configuring component 240), or a V2X Control Function, or a V2X Application Server, or one or more other core network components can configure the QoS policy for the UE 115-a by using an open mobile alliance (OMA) device management (DM) mechanism, policy control and charging (PCC) framework, system information block (SIB) broadcast, dedicated signaling over a radio layer (e.g., radio resource control (RRC) signaling), and/or the like.

In method 500, at Block 504, a packet generated for a first RAT including a first QoS value associated with the first RAT can be obtained from an application. In an aspect, QoS component 340, e.g., in conjunction with processor(s) 305, memory 302, transceiver 370, etc., can obtain, from the application, the packet generated for the first RAT including the first QoS value associated with the first RAT. For example, the application can be executing via processor 305 for causing the UE 115-a to communicate with the one or more other UEs 115-b using broadcast communications (which may correspond to D2D or V2X communications). In addition, the UE 115-a can be configured to transmit broadcast communications over multiple RATs, such as 5G NR, LTE, etc., and/or may be configured to do so by a base station 105. For example, the UE 115-a can be configured, for each RAT, with one or more bearers (or flows) for transmitting the broadcast communications, which may include configuring the one or more bearers with each of one or more UEs in V2X communications to achieve a specified QoS corresponding to the related application. For example, the QoS may be associated with achieving a certain bit rate, error rate, etc., as described below, may correspond to best efforts traffic, and/or the like. In this example, the packet received from the application may be associated with the first QoS value, which may allow the QoS component 340 to select the appropriate bearer (or flow), according to RAT and QoS, for transmitting the packet to achieve the QoS.

In method 500, at Block 506, it can be determined to transmit the packet using a second RAT. In an aspect, QoS component 340, e.g., in conjunction with processor(s) 305, memory 302, transceiver 370, etc., can determine to transmit the packet using the second RAT, e.g., alternatively or in addition to using the first RAT. In one example, QoS component 340 can determine to transmit the packet using the second RAT based on one or more parameters, such as a PSID of the application that generated the packet, a local policy of the UE 115-a (e.g., stored policy stored in memory 302 and/or a QoS policy configured by a base station 105 or a V2X Control Function or a V2X Application Server, as described), one or more parameters related to a load at the UE 115-a (e.g., related to the first or second RAT), one or more ranging or power parameters (e.g., requirements) at the UE 115-a, etc. In one example, the QoS component 340 can compare values of the one or more parameters to one or more respective thresholds in determining to transmit the packet using the second RAT (e.g., where PSID of the application is a certain value, where the load at the UE 115-a related to the first RAT achieves a threshold, etc.). In any case, however, the RATs may utilize different QoS values, and indeed may support QoS values having different granularities.

For example, QoS for LTE V2X communications are based on D2D PPPP where a per packet priority is indicated by the application layer. PPPP has eight possible QoS values that can indicate corresponding priority treatments of packet across all applications executing on the applications. In addition, PPPP may be used to derive a delay requirement of the packet. QoS for NR V2X communications, however, can utilize more QoS parameters for handling NR specifications, including reliability/error rate considerations, delay, etc. For example, QoS for NR V2X communications may include values for multiple different scenarios and possible degrees of automation, such as the following:

that maps to the first QoS value for the first RAT indicated in the packet based on the mapping.

Method 500 can also include, at Block 510, indicating the second QoS value in the packet. In an aspect, QoS indicating component 342, e.g., in conjunction with processor(s) 305, memory 302, transceiver 370, QoS component 340, etc., can indicate the second QoS value in the packet. For example, QoS determining component 344 may modify the QoS value indicated in the packet from a format of the first QoS value to a different format of the second QoS value to ensure the packet is transmitted on the appropriate bearer (or flow) of the second RAT. In an example, mapping and indicating the

| Communication scenario description | | | Payload | Tx rate (Message/ | Max end-to-end latency | Reliability | Data rate | Min required communication range |
|---|---|---|---|---|---|---|---|---|
| Scenario | Degree | Req # | (Bytes) | Sec) | (ms) | (%) | (Mbps) | (meters) |
| Sensor information sharing between UEs supporting V2X application | Lower degree of automation | [R.5.4-001] | [1600] | 10 | 100 | 99 | | 1000 |
| | Higher degree of automation | [R.5.4-002] | | | 10 | 95 | [25] (NOTE 1) | |
| | | [R.5.4-003] | | | 3 | 99.999 | [50] | 200 |
| | | [R.5.4-004] | | | 10 | 99.99 | [25] | 500 |
| | | [R.5.4-005] | | | 50 | 99 | [10] | 1000 |
| | | [R.5.4-006] (NOTE 2) | | | 10 | 99.99 | 1000 | 50 |
| Video sharing between UEs supporting V2X application | Lower degree of automation | [R.5.4-007] | | | [50] | 90 | [10] | [100] |
| | Higher degree of automation | [R.5.4-008] | | | [10] | 99.99 | [700] | [500] |

(NOTE 1):
This is peak data rate.
(NOTE 2):
This is for imminent collision scenario.

Thus, QoS for NR V2X communications may use an extended model of per packet QoS indicators (also referred to as 5G QoS identifier "5QI" or NR V2X per packet QoS index "NVPQI"). In one example, 5QI values may be used to indicate multiple parameters, including allocation and retention policy (ARP), reflective QoS attribute (RQA), notification channel, flow bit rate (e.g., guaranteed flow bit rate (GFBR), maximum flow bit rate (MFBR), etc.), aggregate bit rate (e.g., per UE or session), maximum packet loss rate (PLR), payload size, rate of the packet generation, maximum end to end latency requirement, reliability requirement, communication range requirement, etc.

Based on the difference in QoS identifier or index space between the RATs, method 500 can include, at Block 508, mapping, based on determining to transmit the packet using the second RAT, the first QoS value to a second QoS value associated with the second RAT. In an aspect, QoS determining component 344, e.g., in conjunction with processor(s) 305, memory 302, transceiver 370, QoS component 340, etc., can map, based on determining to transmit the packet using the second RAT, the first QoS value to the second QoS value associated with the second RAT. For example, QoS determining component 344 may configure a mapping between QoS values of the first and second RATs, which may be stored in memory 302. In one example, a base station 105 may configure the UE 115-a with the mapping and/or the UE 115-a can otherwise obtain the mapping from network 210, etc. In any case, QoS determining component 344 can determine the second QoS value for the second RAT second QoS value can be performed at a NAS layer before transmitting the packet using access stratum (AS) layers/protocols.

Method 500 can also include, at Block 512, transmitting, using the second RAT, the packet with the second QoS value to one or more devices. In an aspect, QoS component 340, e.g., in conjunction with processor(s) 305, memory 302, transceiver 370, etc., can transmit, using the second RAT, the packet with the second QoS value to the one or more devices (e.g., UE 115-b). For instance, in this example, QoS component 340 can select the appropriate bearer (or flow) corresponding to the second RAT and the second QoS value to provide, over the second RAT, a same or similar QoS as that corresponding to the first QoS value. A specific example is illustrated in FIG. 8.

Figure 8:
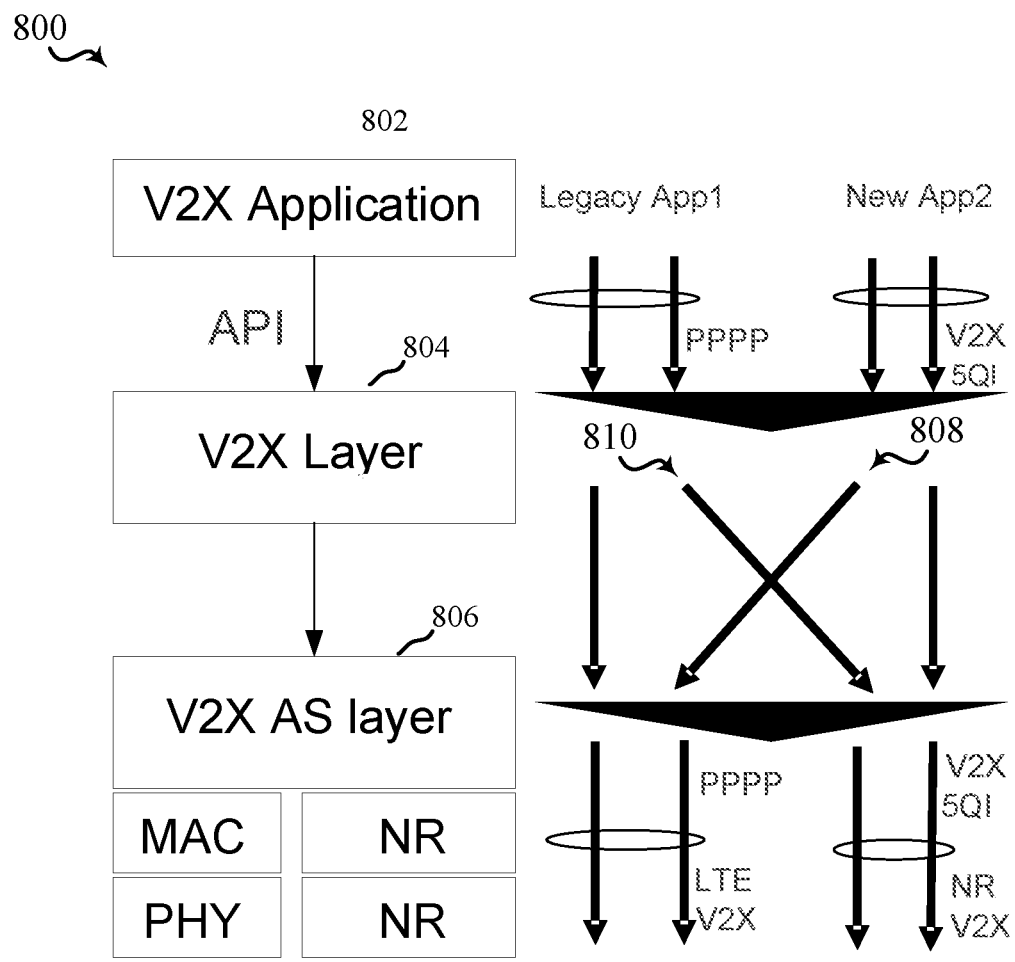
FIG. 8 illustrates an example of a protocol stack for transmitting broadcast communications with QoS, in accordance with various aspects of the present disclosure.

FIG. 8 illustrates an example of a protocol stack 800 for V2X communications at a UE (e.g., UE 115-a). For example, protocol stack 800 can include a V2X application layer 802 for executing one or more applications that can generate packets for transmission using V2X communications, a V2X NAS layer 804 that can manage bearers or flows for transmitting the packets according to a QoS, and/or a V2X AS layer 806 that can segment the packets for transmission over a network connection. In this example, V2X application layer 802 can execute a legacy application and an NR application, which can generate packets with associated PPPP and 5QI QoS values, respectively. The packets can be provided to the V2X NAS layer 804, via an application programming interface (API), for transmission to another device.

In an example, V2X NAS layer 804 can determine to transmit (e.g., broadcast) some packets from the legacy application using the NR RAT, as indicted at 808, and/or to transmit (e.g., broadcast) some packets from the NR application using the legacy RAT, as indicated at 810. Thus, for the packets indicated at 808, for example, the V2X NAS layer 804 can map NR QoS values (e.g., 5QI) to legacy QoS values (e.g., PPPP), and/or for packets indicated at 810, for example, the V2X NAS layer 804 can map legacy QoS values (e.g., PPPP) to NR QoS values (e.g., 5QI). V2X NAS layer 804 can then provide the packets to V2X AS layer 806 for transmission over the appropriate bearers/connections, where the packets can indicate the mapped QoS values and/or can be transmitted according to the mapped QoS values to achieve the corresponding QoS.

FIG. 6 illustrates a flow chart of an example of a method 600 for applying (e.g., by a UE 115-*a*) QoS for transmitting communications to one or more other UEs.

In method 600, optionally at Block 602, a QoS policy can be received from a network. In an aspect, QoS component 340, e.g., in conjunction with processor(s) 305, memory 302, transceiver 370, etc., can receive the QoS policy from the network via base station 105 (e.g., which can configure the QoS policy via QoS configuring component 240), from one or more other UEs (e.g., in V2X communications), and/or the like. For example, the QoS policy may indicate one or more parameters regarding whether to indicate a reflective QoS configuration to one or more UEs in communicating therewith. For example, the one or more parameters may correspond to an identifier of the one or more UEs, a service level of the one or more UEs, etc., such to enable the UE 115-*a* to determine whether or not to indicate the reflective QoS configuration when communicating with the one or more UEs. For example, the QoS component 340 can determine to indicate a reflective QoS configuration to certain UEs having certain identifiers and/or service levels. In addition, the QoS policy may include an initial QoS configuration for the UE 115-*a* to use in communicating with one or more other UEs, such as a certain CA, QAM, etc. The QoS policy/configuration may be received from the base station 105 via OMA-DM, PCC framework, etc. to determine the initial QoS configuration. In addition, the configuration may relate to a specific PSID, etc.

In method 600, at Block 604, a first packet generated for a RAT and including a QoS value associated with the RAT can be obtained from an application. In an aspect, QoS component 340, e.g., in conjunction with processor(s) 305, memory 302, transceiver 370, etc., can obtain, from the application, the first packet generated for the RAT and including the QoS value associated with the RAT. For example, the QoS value can indicate a desired QoS for the application, which can be used by the QoS component 340 (e.g., operating as a NAS layer) in receiving the packet from the application to determine a bearer (which can include a flow) over which to transmit the packet to one or more other UEs (e.g., in a unicast or multicast transmission).

In an example, a unicast transmission in this regard may have associated feedback (e.g., at a transport layer, e.g., transmission control protocol (TCP) acknowledgement (ACK), at an application layer, e.g., real-time transport protocol (RTP) control protocol (RTCP) for RTP streams, etc.). In addition, multicast for a group may expect group members to send and receive traffic from other group members. Thus, a virtual link can exist between UEs in this example. Accordingly, a certain QoS can apply to such a link between UEs and/or there may be multiple links between the same pair of UEs that can have separate QoS (e.g., depending on QoS requirements), such as in a bearer/QoS flow configuration. In addition, for example, the different UEs may have different capabilities, e.g., carrier aggregation (CA), different levels of quadrature amplitude modulation (QAM), such as 16QAM, 64QAM, etc., transmission diversity (TxDiv), packet duplication, etc., which may be used in communicating with one another. Thus, UE 115-*a* may establish the QoS flows that exploit the different functionalities and/or different levels of QoS, which may include different flows for different UE pairs. Similar concepts can be handled similarly for multicast, but for a group of UEs (e.g., instead of a UE pair, as described). V2X interfaces, such as PC5 however, may not have RRC or NAS layer signaling control such to facilitate indicating of QoS capabilities between UEs. Accordingly, as described herein, reflective QoS can be adapted for V2X communications (e.g., for PC5 interface). Reflective QoS can allow a receiving UE to determine or know how to apply QoS to outgoing traffic based on a QoS configuration indicated for received traffic). For example, a first UE transmitting the traffic can include a reflective QoS indicator and/or one or more associated QoS parameters, and the second UE receiving the traffic can use the QoS indicator to determine whether to use the one or more associated QoS parameters in transmitting response traffic to the first UE, as described further herein.

In method 600, at Block 606, a reflective indicator can be set in a header of the first packet to indicate a configuration to be used by the receiving device in transmitting a second packet. In an aspect, reflective QoS indicating component 346, e.g., in conjunction with processor(s) 305, memory 302, transceiver 370, etc., can set the reflective indicator in the header of the first packet to indicate the configuration to be used by the receiving device in transmitting the second packet. For example, reflective QoS indicating component 346 can set the reflective indicator to indicate that the receiving device is to use the same QoS configuration as the UE 115-*a* in transmitting response packets (e.g., feedback, data, etc.) back to the UE 115-*a*, which may include using the same link, bearer, or flow. In an example, the configuration can also include one or more AS layer parameters, such as a CA configuration, a modulation and coding scheme (MCS), TxDiv, etc. to be used by the receiving UE in transmitting back to the UE 115-*a*. In addition, in an example, the QoS configuration can be indicated in the header of the first packet or another portion of the first packet or related communications, where the QoS configuration may include or otherwise indicate a QoS value for the first packet. Moreover, as described, UE 115-*a* can receive the configuration in provisioning from the base station 105 (as described above).

In one specific example, reflective QoS indicating component 346 can indicate the reflective QoS indicator in a service data adaptation protocol (SDAP) header. For example, reflective QoS indicating component 346 can indicate the reflective QoS indicator in bit of a first octet of the SDAP header, and a QFI, which may carry a V2X 5QI value, in the remaining bits of the first octet. In addition, in Mode 3, the UE 115-*a* can initiate the D2D communication link 126 with UE 115-*b* with a QoS setting indicating the QoS based on radio access network (RAN) configuration received from the base station 105, as described above. For example, Mode 3 can be defined by a V2X communication protocol to facilitate sidelink communications among V2X devices.

In method 600, at Block 608, the first packet can be transmitted to the receiving device. In an aspect, QoS component 340, e.g., in conjunction with processor(s) 305, memory 302, transceiver 370, etc., can transmit the first packet to the receiving device (e.g., UE 115-*b*). For example, QoS component 340 can transmit the first packet based on the QoS configuration and with the reflective QoS indicator indicated in the header of the first packet. For example, QoS component 340 can provide the first packet to an AS layer component for segmenting and/or transmitting using one or more lower layers (e.g., a MAC layer, PHY layer, etc.).

In method 600, optionally at Block 610, the second packet can be received from the receiving device transmitted based on the QoS value from the first packet. In an aspect, transceiver 370, e.g., in conjunction with processor(s) 305, memory 302, etc., can receive the second packet from the receiving device (e.g., UE 115-*b*), as described in further detail below, as transmitted based on the QoS value from the first packet. As described, this can include transceiver 370 receiving the second packet over a same bearer or flow over which the first packet is transmitted to the UE 115-*b*.

FIG. 7 illustrates a flow chart of an example of a method 700 for applying (e.g., by a UE 115-*b*) QoS for transmitting communications to one or more other UEs.

In method 700, at Block 702, a first packet generated for a RAT and including a QoS value associated with the RAT can be received from a transmitting device. In an aspect, reflective QoS component 440, e.g., in conjunction with processor(s) 405, memory 402, transceiver 470, etc., can receive, from the transmitting device (e.g., UE 115-*a*), the first packet generated for the RAT and including the QoS value associated with the RAT. For example, reflective QoS component 440 can receive the packet over a bearer or flow established with the UE 115-*a*, which may have a QoS associated with an application that generated the packet. In an example, the packet, as described, can include the QoS value (e.g., as part of a QoS configuration) indicated in the packet, a packet header (e.g., SDAP header), etc., as described, where the QoS value can indicate a QoS used in transmitting the packet to the UE 115-*b*.

In method 700, at Block 704, a reflective indicator can be detected in a header of the first packet to indicate a configuration, including the QoS value, to be used in transmitting a second packet. In an aspect, indicator detecting component 442, e.g., in conjunction with processor(s) 405, memory 402, transceiver 470, reflective QoS component 440, etc., can detect the reflective indicator in the header of the first packet to indicate the configuration, including the QoS value, to be used in transmitting the second packet. For example, the reflective indicator may be in an SDAP header (e.g., one or more bits of a first octet, as described), and indicator detecting component 442 can detect the indicator based on the one or more bits. The reflective indicator may indicate to use a QoS configuration related to the first packet in communicating the second packet. For example, the second packet may be feedback (e.g., HARQ feedback, such as ACK/NACK) or other response to the first packet. In addition, the QoS configuration may be indicated in the first packet or otherwise discernable based on one or more parameters related to the first packet (e.g., a flow over which the first packet is received, a QoS value indicated in the packet—such as a 5QI in remaining bits in the first octet—etc.). In addition, the QoS configurations may also contain radio layer transmission configuration, e.g. CA configuration, MCS, TxDiv settings, etc., which could be derived from radio layer headers or the provided by receiving module.

In method 700, at Block 706, the second packet can be transmitted to the transmitting device based on detecting the reflective indicator and according to the QoS value. In an aspect, reflective QoS component 440, e.g., in conjunction with processor(s) 405, memory 402, transceiver 470, etc., can transmit, based on detecting the reflective indicator and according to the QoS value, the second packet to the transmitting device. For example, reflective QoS component 440 can transmit the second packet back to UE 115-*a* (e.g., in response to the first packet), and may do so with a QoS based on the reflective indicator and/or one or more QoS parameters indicated by the header of the received packet. In this regard, UE 115-*b* can provide QoS for the second packet without being configured with QoS parameters via a network configuration and/or the like. In one example, the QoS configuration may also indicate one or more AS layer parameters for transmitting the second packet, such as CA configuration, MCS, TxDiv, etc., which the reflective QoS component 440 can utilize in transmitting the second packet to the UE 115-*a*.

In one example, transmitting the second packet at Block 706 may optionally include, at Block 708, detecting a congestion condition, and at Block 709, lowering the QoS value based on detecting the congestion condition. In an aspect, congestion detecting component 444, e.g., in conjunction with processor(s) 405, memory 402, transceiver 470, reflective QoS component 440, etc., can detect the congestion condition, and can accordingly lower the QoS value based on detecting the congestion condition. For example, detecting the congestion condition can include congestion detecting component 444 determining that parameters of the QoS configuration may not be fulfilled due to some measure of channel congestion (e.g., signal-to-noise ratio (SNR), channel load, etc.). In this example, congestion detecting component 444 can accordingly lower the QoS configuration to support transmitting the second packet to ensure transmission thereof. In addition, for example, lowering the QoS value can include decreasing an index associated with a set of QoS configurations such that the provided QoS is lower than that indicated by the QoS configuration related to receiving the first packet. For example, a lower QoS can be based on a configuration associated with a lower modulation and coding scheme or other parameters that may result in a lower achievable throughput.

In method 700, optionally at Block 710, a local policy can be created in determining one or more packets to transmit based on the configuration. In an aspect, reflective QoS component 440, e.g., in conjunction with processor(s) 405, memory 402, transceiver 470, etc., can create the local policy in determining the one or more packets to transmit based on the configuration. For example, reflective QoS component 440 can create the local policy and/or corresponding filters in deciding which packets can be transmitted using the same QoS configuration, such as packets with the same PSID as the first packet, with the same layer 2 identifier (e.g., for UE 115-*a* and/or UE 115-*b*) as the first packet, with the same V2X 5QI indicator, PPPP settings, etc. as the first packet, etc. In this regard, reflective QoS component 440 can transmit subsequent packets satisfying policy parameters using the same QoS configuration. A specific example is illustrated in FIG. 9.

Figure 9:
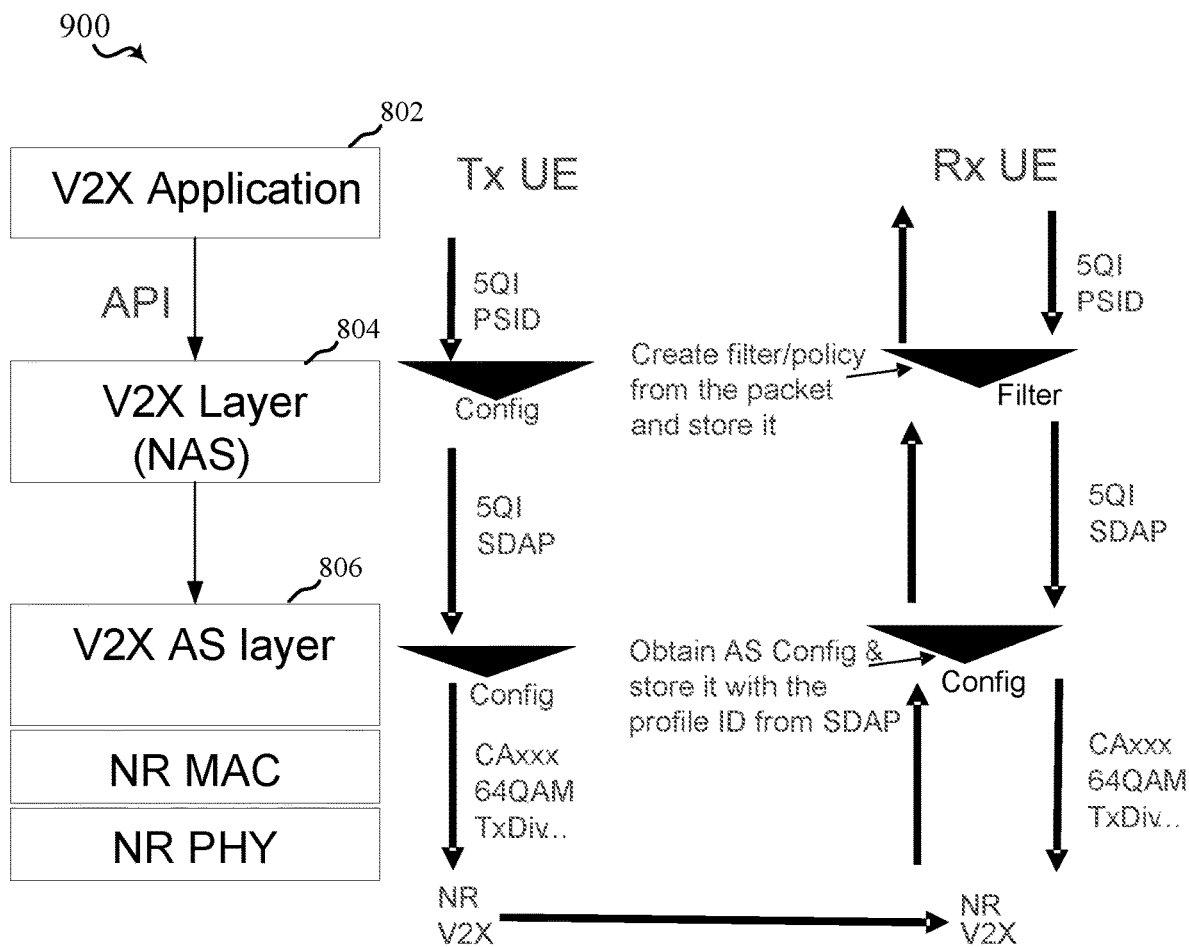
FIG. 9 illustrates an example of a protocol stack for transmitting/receiving unicast or multicast communications with QoS, in accordance with various aspects of the present disclosure.

FIG. 9 illustrates an example of a protocol stack 900 for V2X communications at a UE (e.g., UE 115-*a*). For example, protocol stack 900 can include a V2X application layer 802 for executing one or more applications that can generate packets for transmission, a V2X NAS layer 804 that can manage bearers or flows for transmitting the packets according to a QoS, and/or a V2X AS layer 806 that can segment the packets for transmission over a network connection, as described in connection with FIG. 8. In this example, V2X application layer 802 can execute an NR application, which can generate packets with 5QI parameters, such as a 5QI PSID and/or related QoS configuration. V2X application layer 802 can provide the packets to V2X NAS layer 804 (e.g., via an API). V2X NAS layer 804 can determine one or more QoS parameters for applying to the packet based on the 5QI parameters indicated by the application, which can include selecting a flow over which to transmit the packet. In addition, as described above, V2X NAS layer 804 can determine one or more QoS configuration parameters to indicate in the packet (e.g., in a SDAP header) including a reflective QoS parameter, and/or 5QI parameters, AS layer parameters, etc. V2X NAS layer 804 can provide the packet to the V2X AS layer 806 for applying one or more AS parameters, such as CA configuration, QAM, TxDiv, etc., and transmitting the packets using an NR radio technology at a MAC layer, PHY layer, etc.

The receiving UE (e.g., UE 115-b) can receive the NR radio transmission, formulate a corresponding packet at the V2X AS layer 806 for providing to upper layers. The V2X AS layer 806 may determine one or more configuration parameters for the AS layer to use in transmitting a response packet, including CA configuration, MCS, TxDiv, etc., and may store the parameters in an AS configuration corresponding to a profile identifier from the SDAP. V2X AS layer 806 can provide the packet to V2X NAS layer 804, which can determine QoS configuration parameters from the packet for use in transmitting a response packet, such as a reflective QoS indicator, as described, one or more 5QI parameters, and/or other parameters from which QoS for the received packet can be determined. For example, V2X NAS layer 804 can store the QoS configuration based on the reflective QoS indicator (e.g., along with one or more parameters for identifying response packets, such as the PSID). When the V2X NAS layer 804 at the UE 115-b receives packets from the V2X application layer 802 for transmitting, it can determine whether the packet relates to the same PSID as the received packet (or otherwise determine the packet is a response packet), and can accordingly apply the associated QoS. For example, V2X NAS layer 804 at the UE 115-b can indicate a QoS configuration or one or more parameters (e.g., PSID, 5QI, etc.) for applying QoS to the V2X AS layer 806, and the V2X AS layer 806 can accordingly apply the QoS (and/or related AS parameters that may have been stored in the AS configuration for the profile identifier, as described above) in transmitting the resource packet back to UE 115-a.

Figure 10:
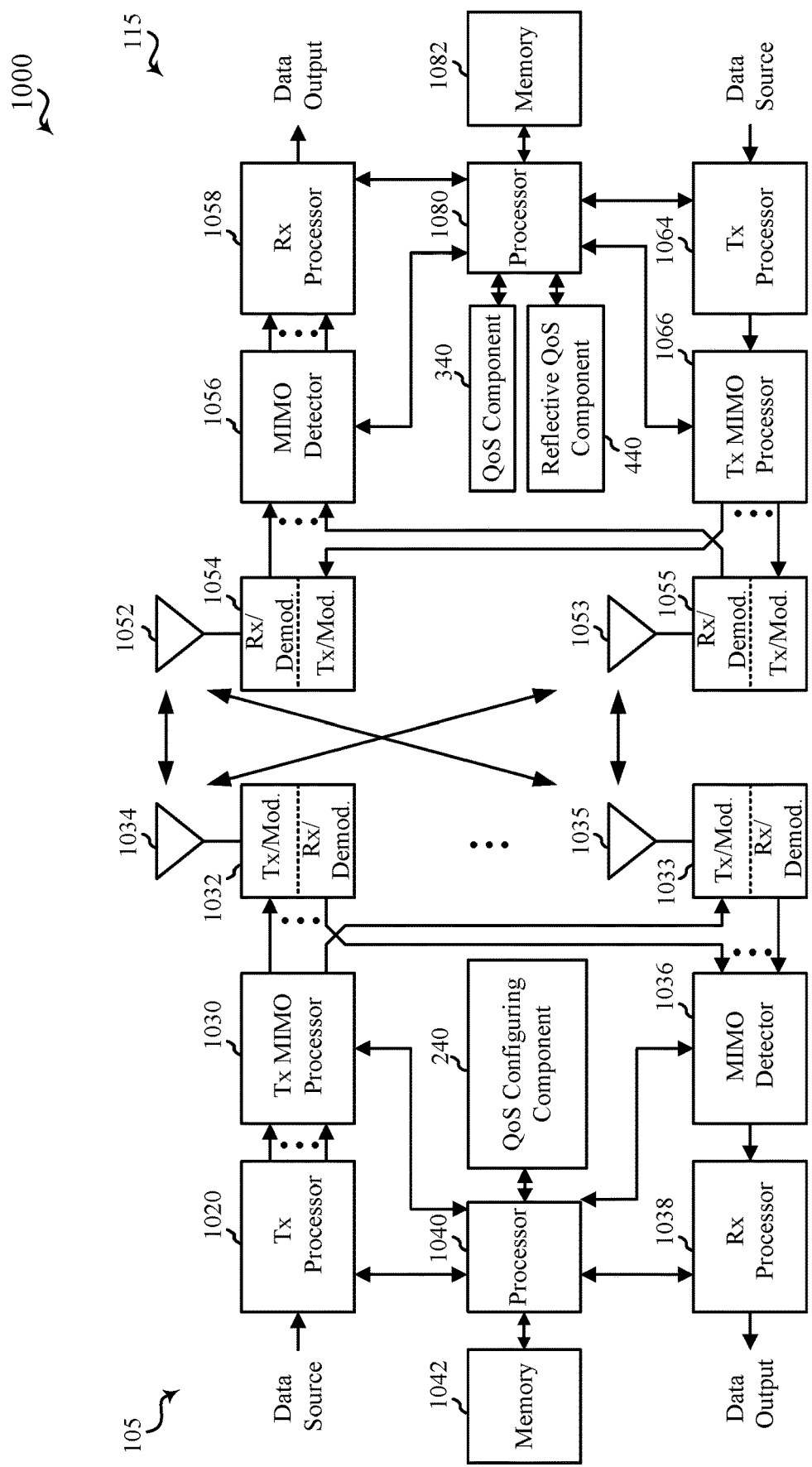
FIG. 10 is a block diagram illustrating an example of a MIMO communication system including a base station and a UE, in accordance with various aspects of the present disclosure.

FIG. 10 is a block diagram of a MIMO communication system 1000 including a base station 105 and a UE 115. The MIMO communication system 1000 may illustrate aspects of the wireless communication system 100 described with reference to FIG. 1. The base station 105 may be an example of aspects of the base station 105 described with reference to FIGS. 1-4. The base station 105 may be equipped with antennas 1034 and 1035, and the UE 115 may be equipped with antennas 1052 and 1053. In the MIMO communication system 1000, the base station 105 may be able to send data over multiple communication links at the same time. Each communication link may be called a "layer" and the "rank" of the communication link may indicate the number of layers used for communication. For example, in a 2×2 MIMO communication system where base station 105 transmits two "layers," the rank of the communication link between the base station 105 and the UE 115 is two.

At the base station 105, a transmit (Tx) processor 1020 may receive data from a data source. The transmit processor 1020 may process the data. The transmit processor 1020 may also generate control symbols or reference symbols. A transmit MIMO processor 1030 may perform spatial processing (e.g., precoding) on data symbols, control symbols, or reference symbols, if applicable, and may provide output symbol streams to the transmit modulator/demodulators 1032 and 1033. Each modulator/demodulator 1032 through 1033 may process a respective output symbol stream (e.g., for OFDM, etc.) to obtain an output sample stream. Each modulator/demodulator 1032 through 1033 may further process (e.g., convert to analog, amplify, filter, and upconvert) the output sample stream to obtain a DL signal. In one example, DL signals from modulator/demodulators 1032 and 1033 may be transmitted via the antennas 1034 and 1035, respectively.

The UE 115 may be an example of aspects of the UEs 115-a, 115-b described with reference to FIGS. 1-4. At the UE 115, the UE antennas 1052 and 1053 may receive the DL signals from the base station 105 and may provide the received signals to the modulator/demodulators 1054 and 1055, respectively. Each modulator/demodulator 1054 through 1055 may condition (e.g., filter, amplify, downconvert, and digitize) a respective received signal to obtain input samples. Each modulator/demodulator 1054 through 1055 may further process the input samples (e.g., for OFDM, etc.) to obtain received symbols. A MIMO detector 1056 may obtain received symbols from the modulator/demodulators 1054 and 1055, perform MIMO detection on the received symbols, if applicable, and provide detected symbols. A receive (Rx) processor 1058 may process (e.g., demodulate, deinterleave, and decode) the detected symbols, providing decoded data for the UE 115 to a data output, and provide decoded control information to a processor 1080, or memory 1082.

The processor 1080 may in some cases execute stored instructions to instantiate a QoS component 340 (see e.g., FIGS. 1 and 3) or a reflective QoS component 440 (see e.g., FIGS. 1 and 4).

On the uplink (UL), at the UE 115, a transmit processor 1064 may receive and process data from a data source. The transmit processor 1064 may also generate reference symbols for a reference signal. The symbols from the transmit processor 1064 may be precoded by a transmit MIMO processor 1066 if applicable, further processed by the modulator/demodulators 1054 and 1055 (e.g., for SC-FDMA, etc.), and be transmitted to the base station 105 in accordance with the communication parameters received from the base station 105. At the base station 105, the UL signals from the UE 115 may be received by the antennas 1034 and 1035, processed by the modulator/demodulators 1032 and 1033, detected by a MIMO detector 1036 if applicable, and further processed by a receive processor 1038. The receive processor 1038 may provide decoded data to a data output and to the processor 1040 or memory 1042.

The processor 1040 may in some cases execute stored instructions to instantiate a QoS configuring component 240 (see e.g., FIGS. 1 and 2).

The components of the UE 115 may, individually or collectively, be implemented with one or more ASICs adapted to perform some or all of the applicable functions in hardware. Each of the noted modules may be a means for performing one or more functions related to operation of the MIMO communication system 1000. Similarly, the components of the base station 105 may, individually or collectively, be implemented with one or more ASICs adapted to perform some or all of the applicable functions in hardware.

Each of the noted components may be a means for performing one or more functions related to operation of the MIMO communication system 1000.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for indicating per-packet quality of service (QoS) in sidelink communications transmitted by a wireless communications device to a receiving device, comprising:
    obtaining, by the wireless communications device, a first packet from an application generated for a radio access technology (RAT), wherein the first packet includes a QoS value associated with the RAT;
    setting a reflective indicator in a header of the first packet to indicate, to the receiving device, to transmit a second packet to the wireless communication device over a sidelink based on a configuration and the QoS value; and
    transmitting the first packet to the receiving device over the sidelink.

2. The method of claim 1, further comprising receiving the second packet from the receiving device, wherein the second packet is transmitted based on the QoS value of the first packet.

3. The method of claim 2, wherein the second packet corresponds to control data to indicate feedback for receiving the first packet.

4. The method of claim 1, wherein the configuration additionally indicates one or more access stratum parameters to be used by the receiving device in transmitting the second packet.

5. The method of claim 4, wherein the one or more access stratum parameters include a carrier aggregation configuration, a modulation and coding scheme, a transmission diversity, or a packet duplication.

6. The method of claim 1, wherein the QoS value indicates at least one of a payload size, a rate of the packet generation, a maximum end to end latency requirement, a reliability requirement, or a communication range requirement.

7. The method of claim 1, further comprising receiving a QoS configuration from a network, wherein the QoS configuration indicates to set the reflective indicator for the application.

8. The method of claim 1, wherein the header is a service data adaptation protocol (SDAP) header that also includes the QoS value.

9. An apparatus for communicating with a receiving device in sidelink communications, comprising:
a transceiver for communicating one or more wireless signals via at least a transmitter and one or more antennas;
a memory configured to store instructions; and
one or more processors communicatively coupled with the transceiver and the memory, wherein the one or more processors are configured to:
obtain a first packet from an application generated for a radio access technology (RAT), wherein the first packet includes a quality-of-service (QoS) value associated with the RAT;
set a reflective indicator in a header of the first packet to indicate, to the receiving device, to transmit a second packet to the apparatus over a sidelink based on a configuration and the QoS value; and
transmit the first packet to the receiving device over the sidelink.

10. The apparatus of claim 9, wherein the one or more processors are further configured to receive the second packet from the receiving device, wherein the second packet is transmitted based on the QoS value of the first packet.

11. The apparatus of claim 10, wherein the second packet corresponds to control data to indicate feedback for receiving the first packet.

12. The apparatus of claim 9, wherein the configuration additionally indicates one or more access stratum parameters to be used by the receiving device in transmitting the second packet.

13. The apparatus of claim 12, wherein the one or more access stratum parameters include a carrier aggregation configuration, a modulation and coding scheme, a transmission diversity, or a packet duplication.

14. The apparatus of claim 9, wherein the QoS value indicates at least one of a payload size, a rate of the packet generation, a maximum end to end latency requirement, a reliability requirement, or a communication range requirement.

15. The apparatus of claim 9, wherein the one or more processors are further configured to receive a QoS configuration from a network, wherein the QoS configuration indicates to set the reflective indicator for the application.

16. The apparatus of claim 9, wherein the header is a service data adaptation protocol (SDAP) header that also includes the QoS value.

17. An apparatus for indicating per-packet quality of service (QoS) in sidelink communications transmitted to a receiving device, comprising:
means for obtaining a first packet from an application generated for a radio access technology (RAT), wherein the first packet includes a QoS value associated with the RAT;
means for setting a reflective indicator in a header of the first packet to indicate, to the receiving device, to transmit a second packet to the wireless communication device over a sidelink based on a configuration and the QoS value; and
means for transmitting the first packet to the receiving device over the sidelink.

18. The apparatus of claim 17, further comprising means for receiving the second packet from the receiving device, wherein the second packet is transmitted based on the QoS value of the first packet.

19. The apparatus of claim 18, wherein the second packet corresponds to control data to indicate feedback for receiving the first packet.

20. The apparatus of claim 17, wherein the configuration additionally indicates one or more access stratum parameters to be used by the receiving device in transmitting the second packet.

21. The apparatus of claim 20, wherein the one or more access stratum parameters include a carrier aggregation configuration, a modulation and coding scheme, a transmission diversity, or a packet duplication.

22. The apparatus of claim 17, wherein the QoS value indicates at least one of a payload size, a rate of the packet generation, a maximum end to end latency requirement, a reliability requirement, or a communication range requirement.

23. The apparatus of claim 17, further comprising means for receiving a QoS configuration from a network, wherein the QoS configuration indicates to set the reflective indicator for the application.

24. A non-transitory computer-readable medium comprising code executable by one or more processors for indicating per-packet quality of service (QoS) in sidelink communications transmitted by a wireless communications device to a receiving device, the code comprising code for:
obtaining, by the wireless communications device, a first packet from an application generated for a radio access technology (RAT), wherein the first packet includes a QoS value associated with the RAT;
setting a reflective indicator in a header of the first packet to indicate, to the receiving device, to transmit a second packet to the wireless communication device over a sidelink based on a configuration and the QoS value; and
transmitting the first packet to the receiving device over the sidelink.

25. The non-transitory computer-readable medium of claim 24, further comprising code for receiving the second packet from the receiving device, wherein the second packet is transmitted based on the QoS value of the first packet.

26. The non-transitory computer-readable medium of claim 25, wherein the second packet corresponds to control data to indicate feedback for receiving the first packet.

27. The non-transitory computer-readable medium of claim 24, wherein the configuration additionally indicates one or more access stratum parameters to be used by the receiving device in transmitting the second packet.

28. The non-transitory computer-readable medium of claim 27, wherein the one or more access stratum parameters include a carrier aggregation configuration, a modulation and coding scheme, a transmission diversity, or a packet duplication.

29. The non-transitory computer-readable medium of claim 24, wherein the QoS value indicates at least one of a payload size, a rate of the packet generation, a maximum end to end latency requirement, a reliability requirement, or a communication range requirement.

30. The non-transitory computer-readable medium of claim 24, further comprising code for receiving a QoS configuration from a network, wherein the QoS configuration indicates to set the reflective indicator for the application.

* * * * *